United States Patent

[11] 3,577,084

[72] Inventors Samuel M. Atcherson Bowie; Robert P. Rodgers, Silver Spring, Md.
[21] Appl. No. 873,193
[22] Filed Nov. 3, 1969
[45] Patented May 4, 1971
[73] Assignee Singer-General Precision, Inc. Binghamton, N.Y.

[54] COMPUTER SOUND GENERATOR
10 Claims, 3 Drawing Figs.

[52] U.S. Cl. .......... 328/14, 328/37, 328/48, 328/185, 307/228, 340/347AD, 235/92PL
[51] Int. Cl. .......... H03k 23/00
[50] Field of Search .......... 328/37, 48, 181, 182, 183, 184, 185, 14; 340/347, (AD), (Inquired); 235/92—74; 307/228

[56] References Cited

UNITED STATES PATENTS

| | | | |
|---|---|---|---|
| 3,119,071 | 1/1964 | Euler et al. .......... | 328/185 |
| 3,480,948 | 11/1969 | Lord .......... | 328/185X |
| 3,490,049 | 1/1970 | Choquet et al. .......... | 328/37X |
| 3,493,961 | 2/1970 | Hansen .......... | 328/185X |
| 3,500,213 | 3/1970 | Ameau .......... | 328/14 |

*Primary Examiner*—John S. Heyman
*Attorneys*—Francis L. Masselle, William Grobman and Andrew G. Pullos

ABSTRACT: The generation of desired sounds and sound waveforms is useful in many fields. For this reason there have been many sound generators devised over the years. The system of this invention utilizes an automatic programming device to control the generation of a large variety of different sounds and sound waveforms. The apparatus comprises a flip-flop or similar device having a plurality of stable conditions. The flip-flop is alternately placed in each of its stable operative states under the control of an automatic programming device. The duration of a complete flip-flop cycle is determinative of the frequency of the generated waveform. The flip-flop output which may be processed through wave-shaping circuitry is subsequently amplitude controlled by a digital ladder attenuator. One automatic programming device which has been useful in this system is a general-purpose digital computer. The system described herein is an improvement over the systems described in the copending patent applications Ser. No. 707,615, SOUND GENERATOR, filed in the names of William E. Beavers, Jr. and William H. Sturdevant, and Ser. No. 710,237, COMPUTER SOUND GENERATOR, filed in the names of Robert A. Atchison, Robert E. Lutolf, and Edward F. Magee.

INVENTOR.
SAMUEL M. ATCHERSON
ROBERT P. RODGERS
BY
William Grolman

INVENTOR.
SAMUEL M. ATCHERSON
ROBERT P. RODGERS
BY
William Grolman

INVENTOR.
SAMUEL M. ATCHERSON
ROBERT P. RODGERS
BY
William Grolman

COMPUTER SOUND GENERATOR

This invention relates to apparatus for generating desired sounds automatically and with great versatility and rapidity.

Electrical systems for generating sounds are not new. One of the more popular such systems is the electronic organ. However, in the past some of the problems of the older systems have made those systems inefficient for some uses. In most cases each sound to be generated has its own generator. In addition, the switching from one generator to another when a sequence of sounds is desired is often cumbersome and complex. In the development of more versatile sound systems, the copending applications, Ser. No. 707,615, SOUND GENERATOR, filed in the U.S. Patent Office in the names of William E. Beavers, Jr., and William H. Sturdevant on Feb. 23, 1968, and Ser. No. 710,237, COMPUTER SOUND GENERATOR, filed in the names of Robert A. Atchinson, Robert E. Lutolf, and Edward F. Magee, disclose sound generation systems for generating a large variety of desired sounds.

In each of those systems a flip-flop is placed in each of its stable states by an automatic programming device which determines the length of time that the flip-flop remains in each of its stable states. The duration of each flip-flop states determines the wavelength of that particular cycle, and the proportion of time that the flip-flop is in each of its two stable states determines the relative amplitude of the sound generated. In one of the embodiments described in the above-mentioned copending applications, three counters, together with gating means for entering information into each of the counters, is used in a system which loads two numeric values, one into one counter and the other into another counter. The third counter is a buffer to permit sufficient storage time for the loading of the words to take place. The value of the numeric word loaded into one of the two counters determines the length of time that the flip-flop remains in one of its stable states and the value of the other word determines the time that the flip-flop is in its other state. Those systems work well, but they have the disadvantage of limited amplitude control before harmonic distortion is apparent to the ear. The system of this invention overcomes that problem.

It is an object of this invention to provide a new and improved sound generation system.

It is another object of this invention to provide a new and improved sound generation system which has positive control.

It is a further object of this invention to provide a new and improved relatively inexpensive sound generation system which is very versatile and rapid in its operation.

Other objects and advantages of this invention will become more apparent as the following description proceeds, which description should be considered together with the accompanying drawings in which.

Figure 1:
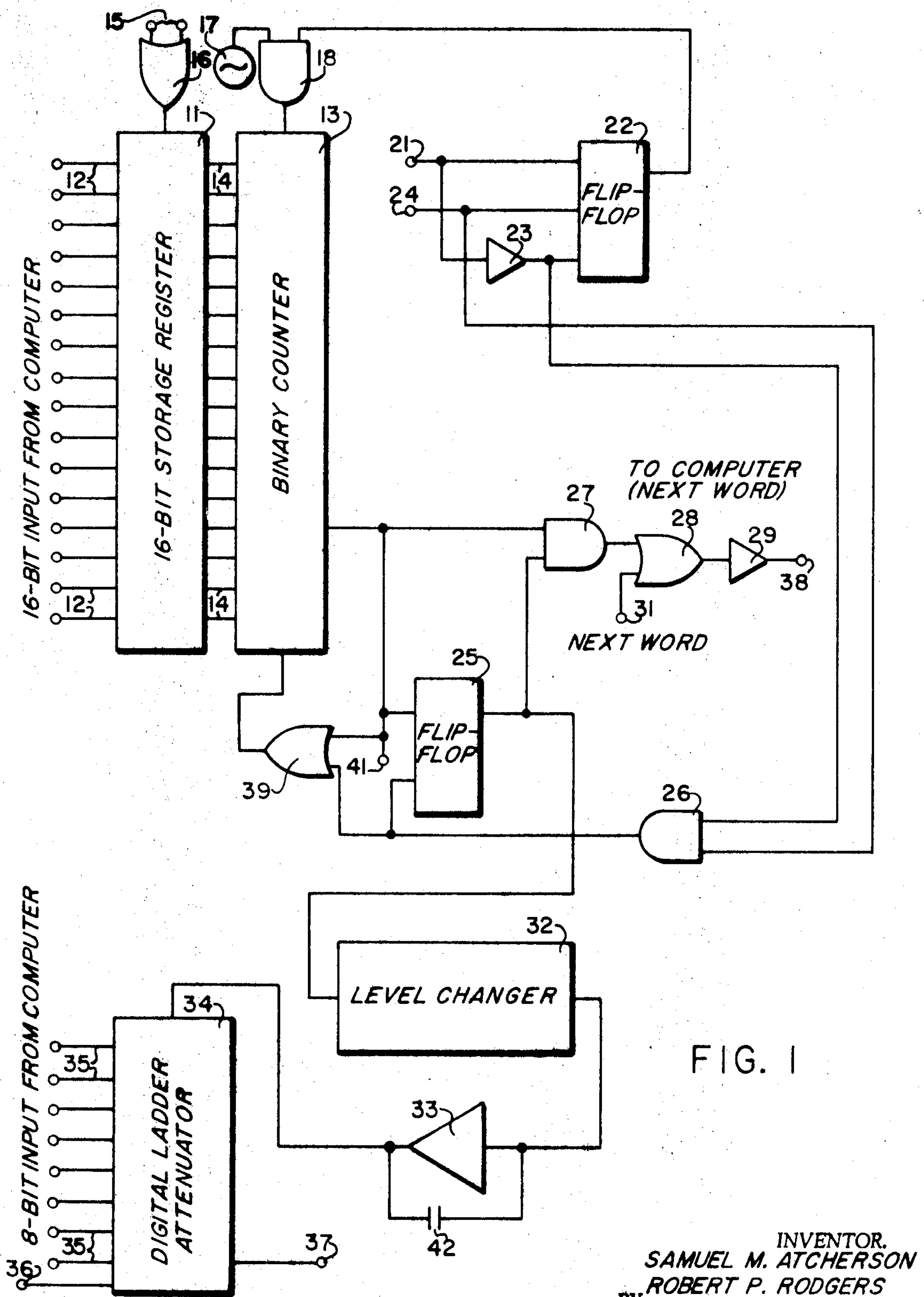
FIG. 1 is an overall block diagram of the system of this invention.

Referring now to the drawings in detail, and more particularly to FIG. 1, the reference character 11 designates a 16-bit register having 16 input terminals 12. The register 11 is connected to a binary counter 13 by means of 16 lines 14. Information is gated into the register 11 by a computer signal applied to either of input terminals 15 through an OR gate 16. A clock 17, or any suitable type, is connected to one input of a coincident gate 18 whose output is connected to the count input of the counter 13. An input terminal 21 is arranged to be connected to the computer and the computer signal applied thereto is applied to the set input of a flip-flop 22. The same signal is also applied through an inverter 23 to the restore input of the flip-flop 22. A trigger pulse is applied through an input terminal 24 to the trigger input of the flip-flop 22. The set output of flip-flop 22 is applied to the other input of the gate 18. In addition, the signal applied to the input terminal 24 is also applied as one input to a gate 26, the other input to which comes from the terminal 21. The output of the gate 26 is applied to one input of gate 39, the output of which is applied to the load enable of the counter 13, and to the restore input of a binary counter stage 25 which has its trigger input connected to the output of the counter 13. The second input of the gate 39 is also connected to the output of the counter 13. The set output from the stage 25 is applied to one input of a gate 27, the other input of which is connected to the output of the counter 13. The output of the gate 27 is applied to one input of an OR gate 28 whose output is applied through an inverter 29 to an output terminal 38 for application to the computer. The other input to the OR gate 28 is connected to an input terminal 31, which is adapted to be connected to the computer. The set output from the counter stage 25 is also applied through a level changer 32 to an integrating operational amplifier 33 whose output is applied to the information input of a digital ladder attenuator 34. The digital ladder attenuator 34 has eight digital inputs connected to eight input terminals 35 and an instruction input connected to an input terminal 36, all of which inputs receive information from the computer. The output from the attenuator 34 is applied to an audio output terminal 37.

When the operation of the apparatus of FIG. 1 is started, a signal which may be manually generated, is momentarily applied to each of the two terminals 21 and 24. This sets the flip-flop 22, placing an enabling signal on one input of the gate 18. From this time until the flip-flop 22 is restored, the gate 18 is open to pass pulses from the clock 17 to the counter 13. At the same time, signals initially applied to the input, from a manual switchboard or the like, result in the application of two signals to the gate 26. The output from the gate 26 resets the binary counter stage 25. Also a 16-bit word is read into the register 11 from the terminals 12 as the result of a signal applied to the OR gate 16. The word stored in the register 11 is a 16-bit number and is applied through the lines 14 to the input of the counter 13. The output of gate 26 applied through OR gate 39 enables counter 13 to transfer the information contained in the register 11 into the counter 13. This number loaded into the counter is the desired number subtracted from the full counter count. The counter 13 counts the clock pulses which are supplied to it from the clock 17, and when a full count is reached, a short output pulse is produced by the counter. This output signal is applied to the set input of the binary counter stage 25, to the gate 27 and to the load enable gate 39. However, by the time the counter stage 25 is set, the output from the counter 13 has decayed, so there are not two signals present at the input to the gate 27, and no signal passes therethrough.

The output of the counter 13, which is applied to the gate 39, causes the counter to accept data from the 16-bit storage register 11, and the counter 13 again begins to count the clock pulses from the clock 17. Again, when the count in the counter 13 reaches a full count, an output pulse is generated by the counter 13. This time, when the output signal from the counter 13 is applied to the input of the gate 27, the set output from the binary counter stage 25 is also present, and the signal passes through the gate 27, the OR gate 28, the inverter 29, and the terminal 38 to be applied to the computer as a request to deliver the next word to the register 11. When the computer applies the next word to the terminals 12, it also applies a signal to at least one of the terminals 15 to cause the new word to be transferred into the register 11. At this time, the register 11 contains a new value. In the meantime, the counter stage 25 is changed into its other state, the reset stage, by the output of the counter 13. The set output from the counter stage 25 is also applied to the input of the level changer 32 which receives a positive output pulse from the counter stage 25 and converts it to a pulse which is symmetrical about a zero axis. The output from the level changer 32 is applied to the input of the integrating operational amplifier 33. During the first count of the word loaded in register 11 the first time, the output of the integrator 33 is a gradually increasing negative potential which increases at a fixed rate. During the second count of the same word, the potential integrates back to its starting potential. During the count of the word just described the integration is always a negative-going signal. During one complete cycle (the total time that each word remains in register 11) the integrator always returns to its starting potential.

From the above, it is evident that a single cycle of operation utilizes the same 16-bit word in the register 11 for two operations of the counter 13. Each operation of the counter 13 causes the counter stage 25 to change its condition and to change the polarity of the potential applied to the input of the integrator 33. Since the time required by the counter 13 to produce an output signal from the time it was set to the value in the storage register is the same for both of these operations, the up and down integrating time is the same. The integrator will always assume its starting potential at the end of the counting cycles. Thus, the time of a single cycle, and therefore the frequency, of the triangular wave is determined by the value of the 16-bit word which is stored in the register 11 by the computer. The amplitude of triangular wave is determined by the digital ladder attenuator 34. The computer also applies an 8-bit word to the input terminals 35, and this word is transferred into the ladder attenuator 34 by the application of a signal to the input terminal 36. The value of the 8-bit word applied to the terminals 35 determines the amplitude of the signal output which appears at the output terminal 37.

Figure 2A:
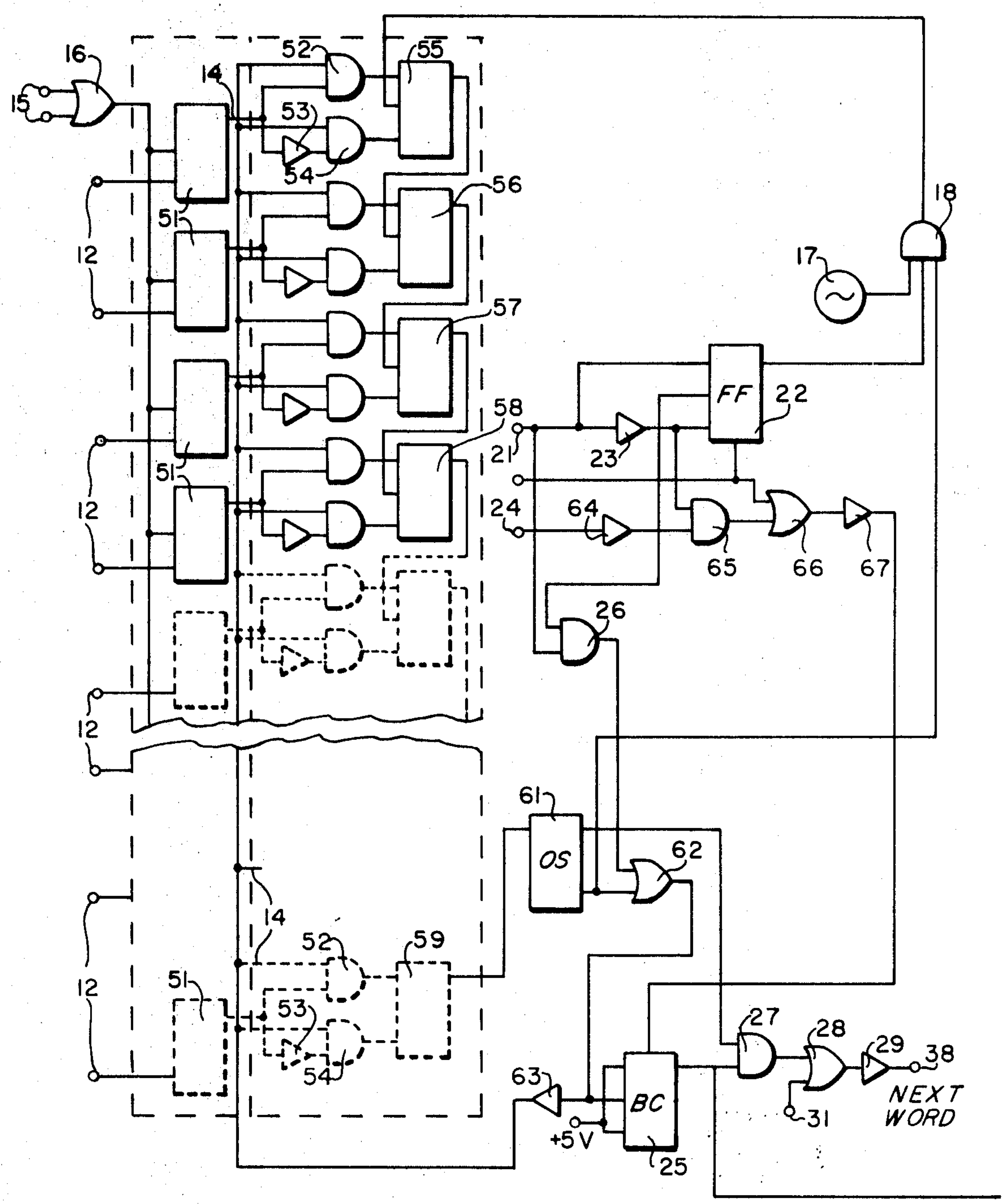
FIG. 2 is a block diagram showing the system in greater detail.
Figure 2B:
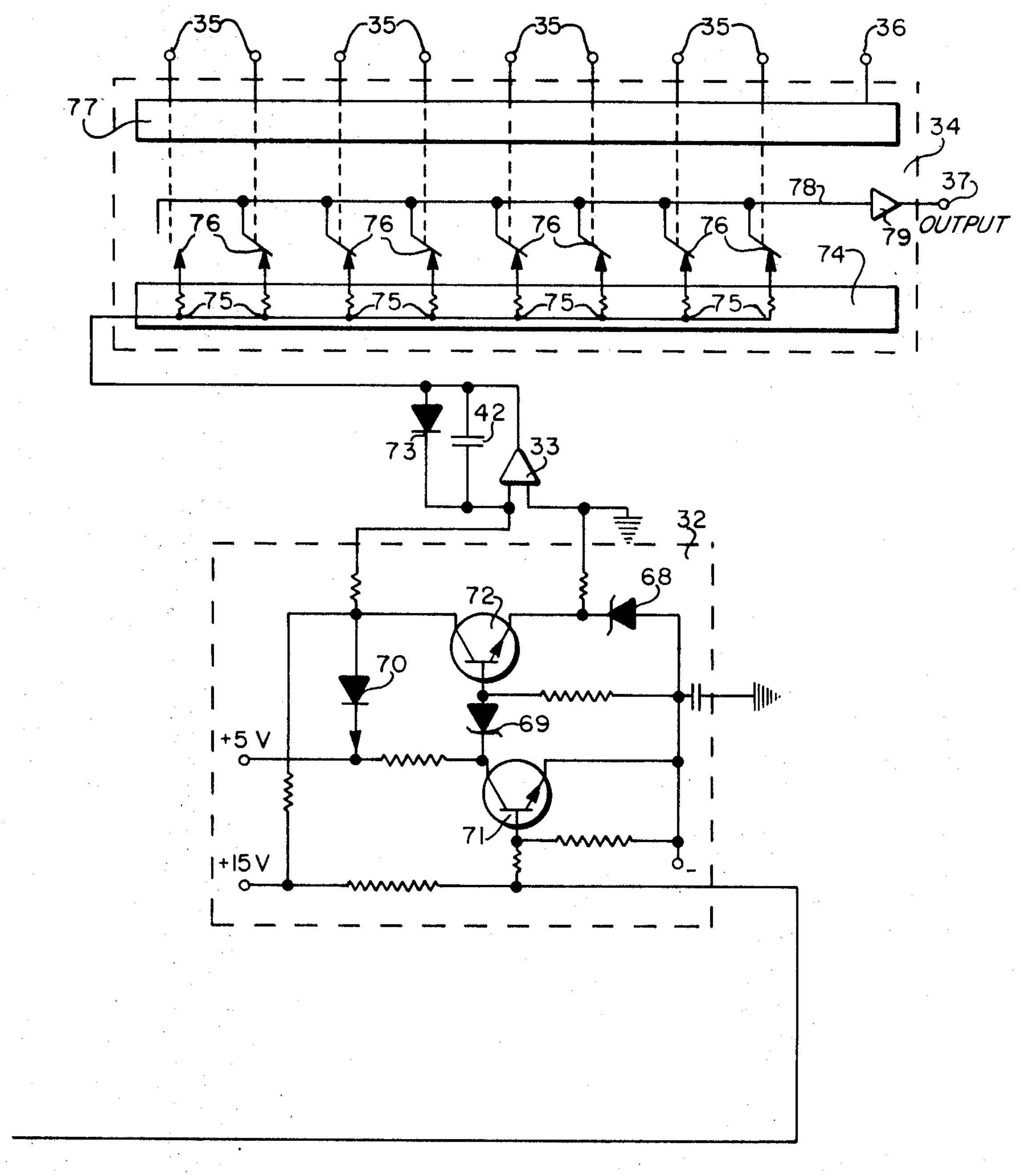

Referring now to FIG. 2, the register 11 is shown comprising a plurality of flip-flops 51 having individual input terminals 12 and a common trigger line from the output of the OR gate 16. Since the 16 flip-flops of the register 11 are identical, only some of them have been shown in order to avoid undue clutter on the drawing. The input terminals 12 are connected to the set inputs of the flip-flops 51. Each line 14 is directly connected to the set output of a flip-flop 51 and to an input of a coincidence gate 52 and through an inverter 53 to an input of a coincidence gate 54. The counter 13 comprises a plurality of flip-flops 55, 56, 57, 58, etc., whose set inputs are connected to the outputs of the gates 52 and whose reset inputs are connected to the outputs of the gates 54. The trigger input to the flip-flop 55 is connected to the clock input terminal 17 through the gate 18. The set output of the flip-flop 55, which is the lowest order flip-flop in the counter 13, is connected to the trigger input of the flip-flop 56. In this manner all of the stages in the counter 13 are cascaded so that the counter 13 counts the clock pulses supplied to the terminal 17. The output from the counter 13 is taken from the set output of the final stage 59 and is applied to a one-shot multivibrator 61. Although it is shown outside of the dashed line which defines the counter 13, the one-shot 61 is really the output stage of the counter 13. The unstable output of the one-shot 61, the set output, is applied as one input to the gate 27 whose output is applied through the OR gate 28 and the inverter 29 to the output terminal 38 as the NEXT WORD signal which is applied to the computer. The stable output of the one shot 61, the restore output, is applied as one input to the gate 18, through which the clock pulses are applied to the counter 13, and also as one input to an OR gate 62 whose output is applied as the trigger input to a binary counter stage 25. The stage 25 is triggered flip-flop whose set and restore inputs are so connected that it is alternately switched from one state to the other. In addition, the stable output from the one-shot 61 is applied through the OR gate 62 and an inverter 63 to all of the gates 52 and 54 in the counter 13. The set output of the binary counter stage 25 is applied as a second input to the gate 27, and the OR gate 28 has a second input from the input terminal 31 to which a NEW WORD signal may be applied. The set output from the binary counter stage 25 is also applied to the input of the level changer 32 which comprises two cascaded transistors 71 and 72. The input from the stage 25 is applied to the base electrode of the transistor 71 through and across appropriate resistors. The output from the transistor 71 is applied from its collector electrode and through a Zener diode 69 to the base electrode of the transistor 72. In addition, the emitter electrode of transistor 72 is connected through another Zener diode 68 to a source of negative potential. The output from the transistor 72 is taken from its collector electrode and is applied to the summing junction input of the integrating operational amplifier 33. The other input of the amplifier 33 is grounded. The output from the amplifier 33 is applied to the input of the amplitude control network 34. The amplitude control 34 comprises a block 74 of precision resistors 75 which are graduated in value. One side of each of the resistors 75 is connected together and to the output from the amplifier 33, and the other side of the resistors 75 is connected to the fixed contact of a switch 76. The movable contacts of the switches 76 are connected together and to a common line 78 which is connected to the input of an amplifier 79 having an output terminal 37 which serves as the electrical output terminal of the system. The movable contacts of the switches 76 are individually connected to input terminals 35 through the circuitry contained in a block 77. An instruction input terminal 36 is also connected to the block 77. The terminals 35 and 36 are connected to outputs from the computer. Starting signals applied to input terminals 21, 24, 31, and 15 may be manually generated by pushbutton switches, for example.

The system shown in detail in FIG. 2 is essentially the same as that shown in the diagram of FIG. 1. Those components which are the same in the two drawings are identified by the same reference characters; those components which are shown broadly in FIG. 1 and with greater detail in FIG. 2 are shown within dashed lines in FIG. 2 and bear the same numbers as those components bear in FIG. 1. Thus, the register 11 is shown in dashed lines in FIG. 2. In addition, to avoid unnecessary redundancy, where the same elements are present in the system in large numbers, only examples of those elements are shown and will be explained. The remainder of the elements will be indicated and it is understood that both their construction and operation are the same. Thus, register 11 comprises 16 flip-flops 51, of which only a few have been shown.

When the operation of the system is initiated, a pulse is applied to the input terminal 31 from a switch panel or other convenient location. This pulse passes through the OR gate 28 and the amplifier 29 to the output terminal 38 which is connected to an input to the computer. This pulse applied to the computer serves as an instruction to the computer to supply the next words to the input terminals 12 and 35 of the system. At the same time, the computer supplies a pulse to an input terminal 15 to transfer the information into the register 11, and the one-shot 61 in its stable state with its set output applied to the gate 18. The enabling pulses applied to inputs 21 and 24 applied through OR gate 62 enables gates 52 and 54. A signal from the computer applied to the input terminals 21 and 24 places the flip-flop 22 into its set state and applies another input to the gate 18. When the 16-bit word is transferred from the computer into the flip-flops 51 by way of the input terminals 12, the outputs from the flip-flops 51 are passed through the gates 52 and 54. The load enabling signals on the gates 52 and 54 are applied thereto from the output of the inverter 63 and the one-shot 61, OR gate 26, and each flip-flop output is transferred through its gate 52 or 54 to the corresponding input of the counter stages 55—59. In this manner, the counter stages 55—59 contain the information that was transferred to the register 11 from the computer. With information contained in the counter 13, clock pulses passing through the gate 18, which has applied to it two conditioning input signals from the flip-flop 22 and the one-shot 61, are applied to the trigger input of the counter stage 55. If the flip-flop 51 in the register 11 which is the lowest order digit contains a one, then the stage 55 was set, and when the clock pulse is applied, the stage 55 is restored. If the stage 55 was restored by the input information, then the clock pulse sets it. When the stage 55 is set, a pulse is generated and is passed on to the trigger input of the subsequent stage 56. The same action which took place with respect to stage 55 now takes place at stage 56, and so on down the line of counter stages until stage 59 is reached. In this manner, the clock pulses which pass through the gate 18 cause the counter 13 to count from the value originally stored therein to its count limit. At that point, the stage 59 is set, generating an output signal which is applied to the set input of the one-shot 61. The one-shot 61 switches to its unstable condition and generates an output pulse at its set output. This removes from gate 18 one of the conditioning signals, closing that gate and cutting off the flow of clock pulses to the counter stage 55. It also applied a signal to the gate 27. At the beginning of the operation of the system, the binary counter stage 25 was cleared, or placed in its restored state, so that now the application of a signal to the input of the gate 27 does not open that gate. However, when the one-shot 61 recovers and switches to its stable stage once again, the conditioning signal is again applied to the gate 18 input to permit the clock pulses to pass through, a signal is applied to the input of the binary counter stage 25 causing that stage to switch to its set state, and the conditioning signal is again applied to the gates 52 and 54. When the stage 25 changed to its set state, it applied an output signal to the gate 27 and a signal to the base electrode of the transistor 71 in the level changer 32 to cause that transistor to conduct. When the transistor 71 conducts, the potential applied to the base electrode of the transistor 72 turns off that transistor. At this time, the potential applied to the input of the amplifier 33 is controlled by the output from the collector electrode of the transistor 72, which is clamped to a reference +5 v. through diode 70. When the transistor 71 is turned off, the potential applied to the base electrode of the transistor 72 causes that transistor to conduct. At this time, the potential applied to the input of amplifier 33 is a −5 v. developed at the Zener diode 68. Thus, the application of a signal to the base electrode of the transistor 71 determines the potential output of the level changer 32.

The operation of the operational amplifier has been explained above in connection with FIG. 1, and the amplifier 33 operates in the same manner in the system of FIG. 2. The amplifier is a differential amplifier which integrates the difference of the input signals, one of which is zero volts DC. When transistor 72 is nonconducting, the potential applied to the input of the amplifier 33 is +5 v. DC, and the amplifier 33 integrates with a negative slope. When transistor 72 is conducting, the potential applied to the input of the amplifier 33 is −5 v. DC, and the amplifier integrates with a positive slope. As indicated above, the amplifier 33 integrates. This is accomplished by the capacitor 42 in the amplifier feedback path. As a positive potential is applied to the input of the amplifier 33, the output of amplifier 33 is a negative potential. The capacitor 42 in the feedback path gradually charges during the time that the negative potential is present at the amplifier output, and the potential at the amplifier output gradually increases in a negative direction. Should the output potential be positive, diode 73 will conduct and short out the integrating capacitor 42. So long as the time constant of the capacitor 42 and the resistance in the circuit is large compared with the time that any single potential exists at the amplifier 33 output, the rise of potential at the output will be substantially linear. Thus, the output of the amplifier 33 produces a triangular wave. The actual amplitude of the output from the amplifier 33 is determined by the attenuator 34. The output signal is applied to the network 74 of precision resistors 75 in the digital ladder attenuator 34. At the same time, the block 77 contains digital information which was supplied to it by the computer through the input terminals 35. When a one is supplied to one of the terminals 35, the corresponding switch 76 remains closed, and when a zero is applied to a terminal 35, the corresponding switch 76 is opened. Of course, the reverse could just as well be the case. The composite potential on the line 78 is then the sum of all of the potentials supplied to it through the closed switches 76 and the resistors 75. In this manner, the amplitude of the signal applied to the input of the amplifier 79 is determined by the value of the number supplied by the computer to the attenuator 34. The block 77, although not shown in this drawing, contains storage means as well as switch operating mechanisms. In this respect, the switches 76 are really only exemplary, since the switches actually used are electronic switches which are readily operated by the application of potentials thereto. For example, diodes which are biased open may be used and may be closed whenever a one is applied to the diode to overcome the bias. In addition, transistor switches, or any other suitable type may be used. Although for this discussion, it was assumed that pulses were applied to terminals 35, steady-state signals could just as well be used. A control signal applied from the computer to the terminal 36 opens the data storage devices in the block 77 to receive new information from the computer. This may be at word rate or sound envelope rate.

When the counter 13 generated its output which set the one-shot 61, and then the one-shot 61 returned to its unstable state, the resultant output signal through the inverter 63 opened the gates 52 and 54 to transfer into the counter stages 55—59 the information contained in the register stages 51. Since no additional information had been transferred into the register 11 from the computer, the same numerical value was again transferred into the counter 13. The recovery of the one-shot 61 to its stable condition restores the signal to the gate 18, so that clock pulses once again begin flowing to the counter 13. The counter 13 again counts to the limit of its capacity and the operation of the system repeats itself. However, this time the set output from the one-shot 61 is applied to the input of the gate 27 while the binary counter stage 25 is set, so the the gate 27 has its two conditioning inputs and passes a pulse which eventually reaches the terminal 38 and the computer to call up the next word, A new word is now transferred into the register 11. At the same time, the potential applied to the base electrode of the transistor 71 changes, and the output of the level changer 32 switches polarity. The voltage output of the integrator 33 then changes at a constant rate until the condition of the binary counter stage 25 again changes state. Since the change of the conditions of the binary counter stage 25 depends upon the output from the counter 13, the time between such changes depends upon the value of the word in the counter 13. In the operation of this system, the same word is used for a complete cycle; that is, one word is transferred into the register 11 where it remains for the period of one complete triangle wave. The word is transferred to the counter 13 and the counter counts up from that same value two complete times. Thus, both negative slope and positive slope voltage outputs from the amplifier 33 in any cycle are of the same duration and reach the same value. The composite is a triangle wave of negative polarity that starts at zero volts DC and terminates at zero volts DC. Since no new word was transferred from the computer to this system during the second half of the cycle, the information from the computer which was applied to the input terminals 35 of the amplitude control network 34 remains stored therein, and the amplitude control set in the attenuator 34 is the same as during the first half of the cycle. The output signal at the terminal 37 as a result of the single cycle of operation described is a triangular wave whose wavelength is controlled by the value of the digital word applied to the input terminals 12 and stored in the register 11, and whose amplitude is determined by the value of the digital information applied by the computer to the input terminals 35. Of course, in the operation of this system, the next word supplied by the computer to this system may be of the same value or may have an entirely different value. If the value of the second 16-bit word supplied to the input terminals 12 were smaller, then the wavelength of the next cycle would be greater; and if the value of the word supplied to the input terminals 12 were greater, then the wavelength of the next cycle would be smaller. If the value of the word supplied to the input terminals 35 were smaller, then the amplitude of the next cycle would be smaller. The converse is also true. The triangular wave generated by this system has odd order harmonics with a harmonic relationship of $1/N^2$ which can be filtered out if desired or which can be used singly or in concert. If add order harmonics with a relation of 1/N are desired, the integrator may be bypassed. If the triangular wave is applied to a third-order filter, the output of the filter will be a sine wave of the same frequency. By manipulation of the output wave of this system, the resultant waveforms can be of a wide variety of shapes and sizes. These waveforms applied to suitable acoustic transducers will produce sounds having the same waveforms. Since the sizes and the shapes of the waveforms produced by this system are under the control of a computer, a large variety of desired sounds can be produced by computer control.

The above specification has described a new and improved waveform generation system which can produce desired acoustic waveforms under the control of a general-purpose digital computer. It is realized that this description may indicate to other in the art how the principles of this invention may be used without departing from its spirit. It is, therefore, intended that this invention be limited only by the scope of the appended claims.

We claim:

1. A system for generating desired electrical waveforms under the control of a programmable device, said system comprising a counter, means for entering into a said counter first information representing a first numerical value, means for supplying to said counter digits at a prescribed rate for causing said counter to count from the value entered therein to the capacity of the counter, said counter generating an output signal when its capacity is reached, a bistable device connected to the output of said counter, successive output signals from said counter causing said bistable device to assume its two stable conditions alternately, means responsive to one condition of said bistable device for requesting a new value to be inserted into said counter, means responsive to both conditions of said bistable device for causing said counter to be reset to the value entered therein, and means responsive to the outputs from said bistable device for developing an electrical signal which increases in one direction in response to an output from said device in one of its stable conditions and which increases in the other direction in response to an output from said device in the other of its stable conditions.

2. The system defined in claim 1 further including a register adapted to receive numerical information, and means connected from said register to the inputs of said counter for transferring the information stored in said register into said counter.

3. The system defined in claim 1 further including means responsive to the output from said counter for interrupting the supply of digits to said counter, and means for restoring the supply of said digits to said counter a prescribed time after the occurrence of an output from said counter.

4. The system defined in claim 1 further comprising means connected to the output from said electrical signal developing means for modifying the amplitude of said electrical signal, said amplitude modifying means including means for receiving second information representing a second numerical value, and means responsive to said numerical value for attenuating the amplitude of said electrical signal by an amount proportional to said second value.

5. The system defined in claim 1 further including a digital programmable device, and means for applying digital information representing numerical values from said programmable device to the inputs to said counter.

6. A system for generating electrical waveforms of desired shapes and amplitudes, said system comprising a register, means for applying to said register first information representative of numerical values, a counter, means for transferring into said counter the information applied to said register, means for applying to said counter a series of electrical pulses having a prescribed pulse rate to cause said counter to count from the value stored therein, said counter generating a first electrical signal when its count capacity is reached, a bistable device having two stable conditions, means for applying said first signal to said device so that said device is alternately placed into each of its stable conditions by successive occurrences of said first signal, means responsive to a first output from said device in one of its stable conditions for generating a second signal which causes second information representing another numerical value to be applied to said register, and means for generating an electrical waveform in one direction from the output of said device in one of its stable conditions and for generating the same electrical waveform in another direction from the output of said device in the other of its stable conditions.

7. The system defined in claim 6 further including an attenuator, said attenuator comprising means for storing third information representative of a third numerical value, means for applying such third information to said attenuator, means for attenuating any signal applied thereto in proportion to the numerical value of said third information, and means for applying to said attenuator said electrical waveform so that the length of said waveform is determined by the value of said first information and the amplitude of said waveform is determined by the value of said second information.

8. The system defined in claim 7 further including means for interrupting said series of electrical pulses in response to said first signal, and means for connecting the input of said interrupting means to one output of said device.

9. The system defined in claim 8 wherein said means for applying said first, second, and third information comprises digital programmable apparatus; said system further comprising means for connecting the outputs from said programmable apparatus to the inputs of said register and said attenuator; and means for connecting an input to said programmable apparatus to said one output of said device so that said second signal is applied to said programmable apparatus to direct said programmable apparatus to supply new first, second, and third information to said system.

10. The system defined in claim 9 further including means for manually introducing into said system signals for initiating operation of said system, said system including means for manually generating said second signal to cause said programmable apparatus to supply first, second, and third information; means for manually setting the initial condition of said device; and means for manually causing the transfer information from said register into said counter.